United States Patent
Jo et al.

(10) Patent No.: US 12,379,985 B2
(45) Date of Patent: Aug. 5, 2025

(54) METHOD OF PROCESSING EXCEPTION EVENTS AND STORAGE DEVICE FOR PROCESSING EXCEPTION EVENTS

(71) Applicant: SAMSUNG ELECTRONICS CO., LTD., Suwon-si (KR)

(72) Inventors: Yejin Jo, Suwon-si (KR); Bi-Oh Park, Suwon-si (KR); Jungtae Lee, Suwon-si (KR); Jungyoung Kim, Suwon-si (KR); Kwangwong Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 22 days.

(21) Appl. No.: 18/367,165

(22) Filed: Sep. 12, 2023

(65) Prior Publication Data
US 2024/0248780 A1 Jul. 25, 2024

(30) Foreign Application Priority Data
Jan. 20, 2023 (KR) .................. 10-2023-0008949

(51) Int. Cl.
*G06F 11/00* (2006.01)
*G06F 11/07* (2006.01)
*G06F 11/30* (2006.01)

(52) U.S. Cl.
CPC ...... *G06F 11/0772* (2013.01); *G06F 11/0781* (2013.01); *G06F 11/3034* (2013.01)

(58) Field of Classification Search
CPC ............ G06F 11/0772; G06F 11/0781; G06F 11/3034
See application file for complete search history.

(56) References Cited

U.S. PATENT DOCUMENTS

| | | | |
|---|---|---|---|
| 9,026,854 B2 | 5/2015 | Jeong et al. | |
| 9,164,890 B2 | 10/2015 | Shin et al. | |
| 9,298,613 B2 | 3/2016 | Kim et al. | |
| 9,348,537 B2 | 5/2016 | Raviv et al. | |
| 10,418,115 B2 | 9/2019 | Blodgett et al. | |
| 10,466,903 B2* | 11/2019 | Benisty | G06F 13/24 |
| 11,029,856 B2 | 6/2021 | Shin et al. | |
| 2017/0286205 A1* | 10/2017 | Jeong | G06F 11/3072 |
| 2019/0013081 A1* | 1/2019 | Blodgett | H04L 9/0861 |
| 2021/0034285 A1 | 2/2021 | Kim et al. | |
| 2021/0034296 A1 | 2/2021 | Park et al. | |
| 2021/0034513 A1 | 2/2021 | Kim et al. | |
| 2022/0066880 A1* | 3/2022 | Breen | G06F 11/1048 |

(Continued)

FOREIGN PATENT DOCUMENTS

| | | |
|---|---|---|
| KR | 10-1754545 B1 | 7/2017 |
| KR | 10-1861744 B1 | 5/2018 |
| KR | 10-1911059 B1 | 10/2018 |

OTHER PUBLICATIONS

Communication issued May 22, 2024 by the European Patent office in European Patent application No. 23216405.3.

*Primary Examiner* — Jonathan D Gibson
(74) *Attorney, Agent, or Firm* — Sughrue Mion, PLLC

(57) ABSTRACT

A method of processing exception events for a storage device includes generating, by the storage device, a first exception event alert comprising a first value and a second value, where the first value indicates generation of exception events and the second value indicates attributes of the exception events, and transmitting, from the storage device, the first exception event alert to a host device.

19 Claims, 13 Drawing Sheets

(56) References Cited

U.S. PATENT DOCUMENTS

2022/0237079 A1* 7/2022 Cariello .............. G06F 11/0793
2022/0237080 A1* 7/2022 Attanasio .............. G06F 3/0679
2024/0248780 A1* 7/2024 Jo ........................... G06F 3/061

* cited by examiner

METHOD OF PROCESSING EXCEPTION EVENTS AND STORAGE DEVICE FOR PROCESSING EXCEPTION EVENTS

CROSS-REFERENCE TO RELATED APPLICATION(S)

This application is based on and claims priority to Korean Patent Application No. 10-2023-0008949, filed on Jan. 20, 2022, in the Korean Intellectual Property Office, the disclosure of which is incorporated herein by reference in its entirety.

BACKGROUND

1. Field

Example embodiments of the disclosure relate to processing of exception events, and more particularly, to a method of processing exception events and a storage device for processing exception events.

2. Description of Related Art

Storage device are continuously required to have improved capacity and performance. In this regard, interfaces of such storage devices have been developed and commonly used to quickly process massive data. Universal flash storage (UFS) devices receive a write request or a read request from a host device and output corresponding responses through an UFS interface which may quickly process massive data.

The UFS interface regulates processing of exception events in addition to general events such as a write request or a read request from a host device.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

One or more example embodiments provide a method of processing exception events which may efficiently process the exception events in an interface between a host device and a storage device, and a storage device for processing exception events implementing the method.

Additional aspects will be set forth in part in the description which follows and, in part, will be apparent from the description, or may be learned by practice of the presented embodiments.

According to an aspect of an example embodiment, a method of processing exception events for a storage device may include generating, by the storage device, a first exception event alert comprising a first value and a second value, where the first value indicates generation of exception events and the second value indicates attributes of the exception events, and transmitting, from the storage device, the first exception event alert to a host device.

According to an aspect of an example embodiment, a method of processing exception events for a universal flash storage (UFS) device may include generating an event alert bit corresponding to exception events, generating, by the UFS device, a response UFS protocol information unit (UPIU) comprising an attribute value corresponding to an exception event status attribute and outputting the response UPIU.

According to an aspect of an example embodiment, a storage device may include a memory, a device interface configured to receive a command UFS UPIU corresponding to a write or a read to the memory, and transmit a response UPIU to a host device, and a device controller configured to generate the response UPIU based on exception events occurring, where the response UPIU comprises a first value indicating generation of exception events and a second value indicating attributes of the exception events.

BRIEF DESCRIPTION OF DRAWINGS

The above and other aspects, features, and advantages of certain example embodiments of the present disclosure will be more apparent from the following description taken in conjunction with the accompanying drawings, in which.

DETAILED DESCRIPTION

Figure 1:
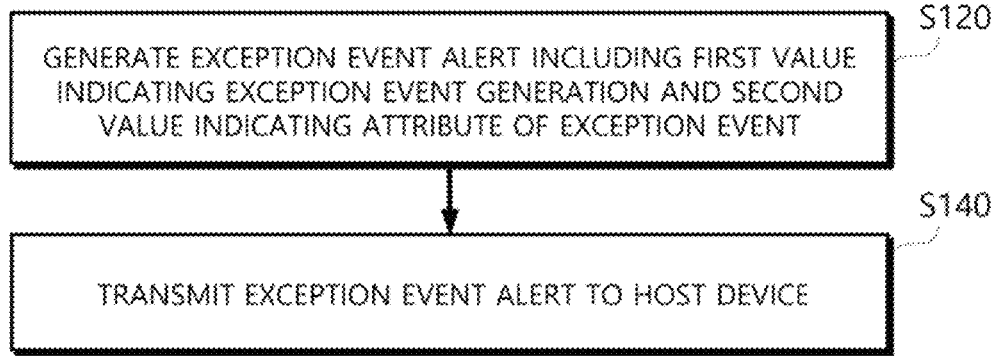
FIG. 1 is a flowchart of a method of processing exception events according to an embodiment of the present disclosure.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 2:
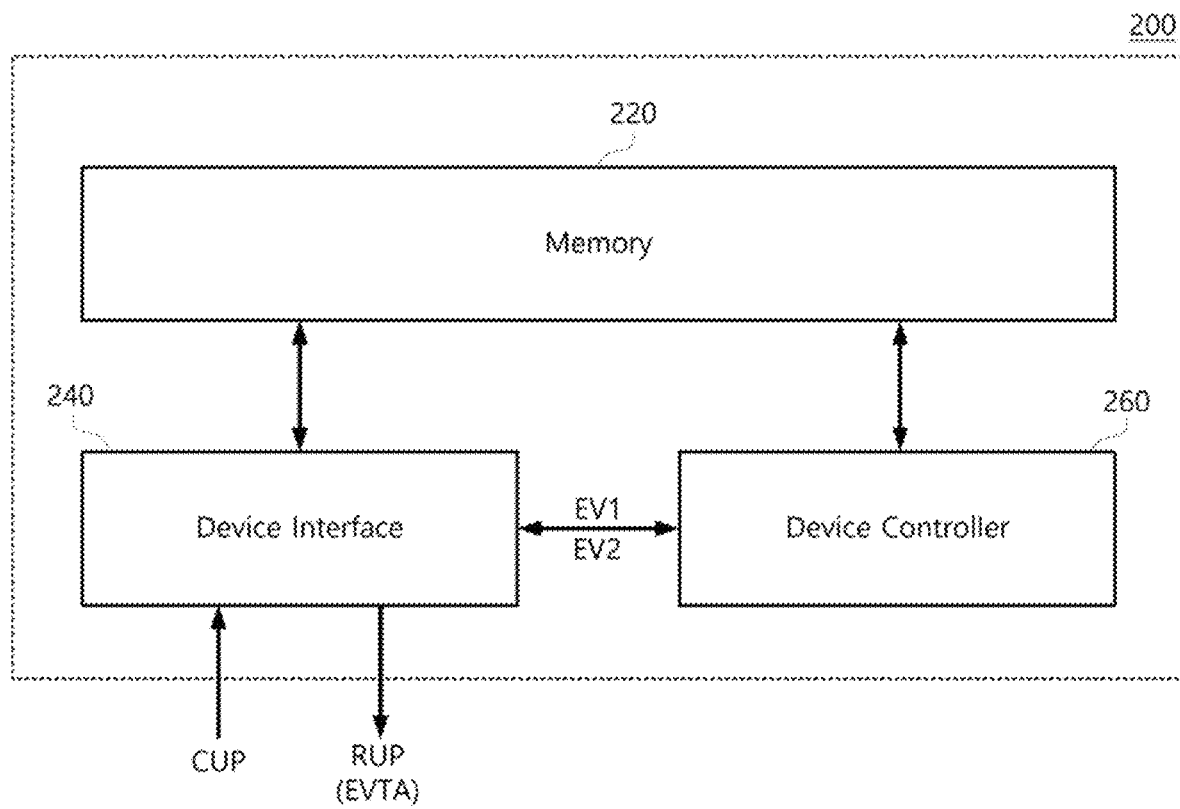
FIG. 2 is a diagram of a storage device according to an embodiment of the present disclosure.
Figures 3, 4:
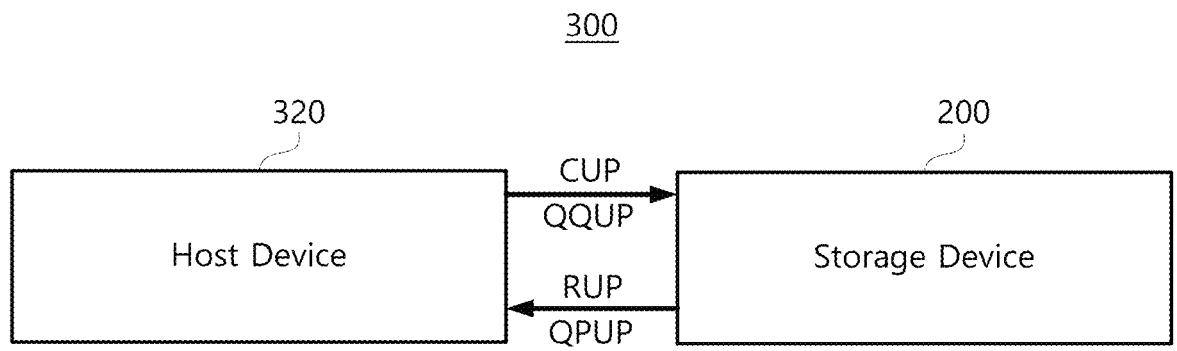
FIG. 3 is a diagram of a system according to an embodiment of the present disclosure.
FIG. 4 is a diagram of a data structure of a second value according to an embodiment of the present disclosure.

FIG. 1 is a flowchart 100 of a method of processing exception events according to an embodiment of the present disclosure. FIG. 2 is a diagram of a storage device 200 according to an embodiment of the present disclosure. FIG. 3 is a diagram of a system 300 according to an embodiment of the present disclosure.

Referring to FIGS. 1 through 3, the method shown in flowchart 100 of processing exception events according to an embodiment of the present disclosure may include generating an exception event alert EVTA including a first value EV1 and a second value EV2 regarding exception events in a storage device 200 in operation S120 and transmitting the exception event alert EVTA from the storage device 200 to, for example, a host device (e.g., host device 320) in operation S140. The first value EV1 may indicate generation of exception events and the second value EV2 may indicate attributes of exception events.

The storage device 200 according to an embodiment of the present disclosure may include a memory 220, a device interface 240, and a device controller 260. The storage device 200 may be designated as a universal flash storage (UFS) device. The storage device 200 may be implemented as a memory card, however, the present disclosure is not limited thereto. The system 300 according to an embodiment of the present disclosure may include the storage device 200 and a host device 320. The system 300 may be one of various electronic devices such as a computer, a tablet personal computer (PC), a mobile terminal, a black box, a digital camera, and a home network, one of various servers forming a computing network, or one of functional modules forming electronic devices or servers. The host device 320 may be designated as a UFS host.

The memory 220 included in the storage device 200 may be a volatile memory, a non-volatile memory, etc. In some embodiments, the memory 220 may include a flash memory, a magneto-resistive random access memory (MRAM), a phase-change RAM (PRAM), and a Ferroelectric RAM (FeRAM). However, the present disclosure is not limited thereto.

The host device 320 may transmit a command UFS protocol information unit (UPIU) CUP, which may instruct a write or a read of the memory 220 included in the storage device 200. The storage device 200 may receive the command UPIU CUP from the host device 320 and may perform a corresponding process. The storage device 200 may transmit the result of the process to the host device 320 as a response UPIU RUP. The command UPIU CUP and the response UPIU RUP may be transmitted and received between the storage device 200 and the host device 320 by a UFS protocol.

The device interface 240 included in the storage device 200 may provide an interface, which may receive the command UPIU CUP from the host device 320 and transmit the response UPIU RUP to the host device 320, through a UFS interface. However, the present disclosure is not limited thereto. The device interface 240 may provide various interfaces such as small computer system interface (SCSI), serial attached SCSI (SAS), serial advanced technology attachment (SATA), peripheral component interconnect express (PCIe), embedded MultiMediaCard (eMMC), fiber channel (FC), advanced technology attachment (ATA), integrated drive electronics (IDE), universal serial bus (USB), and IEEE 1394 (Firewire). The device interface 240 may be formed of a hardware and firmware for interfacing with the host device 320.

The exception event alert EVTA according to an embodiment of the present disclosure may be included in the response UPIU RUP to be generated and transmitted. In other words, the exception event alert EVTA according to an embodiment of the present disclosure may be transmitted to the host device 320 through the response UPIU RUP in response to the command UPIU CUP of the host device 320. The device controller 260 included in the storage device 200 may control the response UPIU RUP to be processed as the exception event alert EVTA including the second value EV2. In this regard, the device controller 260 may be formed of a hardware and firmware.

FIG. 4 is a diagram of a data structure of a second value EV2 according to an embodiment of the present disclosure.

Referring to FIGS. 3 and 4, the exception events generated by the storage device 200 may be indicated by the second value EV2. FIG. 4 illustrates the second value EV2 of 1 byte. The exception events may be pre-defined events. For example, the exception event may be at least one of exception events defined as dynamic device capacity, system pool exhaustion, background operation, excessively high temperature, excessively low temperature, performance throttling, and write booster buffer flush with respect to the storage device 200.

An event regarding the dynamic device capacity may indicate a case where dynamic capacity is required in the storage device 200. An event regarding the system pool exhausted may indicate a case where system resources for additional processing are insufficient in the storage device. An event regarding the background operation may indicate a case where caution is required for the standard needed in the background operation in the storage device 200.

Events regarding excessively high temperature and excessively low temperature may respectively indicate a case where control of temperature (for example, Tease temperature) allowed in the storage device 200 is required. In the UFS specification 4.0, Temperature Notification (*TN) and Dynamic Thermal Throttling (*DTT) functions are added. When the temperature of the storage device 200 reaches the upper limit and the lower limit of a defined temperature, events regarding excessively high temperature and excessively low temperature may be processed. In order to process the events regarding excessively high temperature and excessively low temperature, "bDeviceTooHighTempBoundary" and "bDeviceTooLowTempBoundary" may be defined to provide temperature boundary information of the storage device 200.

An event regarding the performance throttling may indicate a case where the storage device 200 is operating at reduced performance. An event regarding the write booster buffer flush may indicate a case where flushing to the memory 220 in the storage device 200 is required.

Seven bits of the second value EV2 may be respectively designated to a corresponding event from among the above-described events. Based on the corresponding event being generated, each bit value may be set as "0" or "1". For example, bit 0 of the second value EV2 may be designated as a bit value for the dynamic device capacity DYNCAP_EVENT_EN, bit 1 may be designated as a bit value for the system pool exhausted SYSPOOL_EVENT_EN, and bit 2 may be designated as a bit value for the background operation URGENT_BKOPS_EN. Also, bit 3 of the second value EV2 may be designated as a bit value for excessively high temperature TOO_HIGH_TEM_EN, bit 4 may be designated as a bit value for excessively low temperature TOO_LOW_TEMP_EN, bit 5 may be designated as a bit value for the write booster buffer flush WRITEBOOSTER_EVENT_EN, and bit 6 may be designated as a bit value for the performance throttling PERFORMANCE_THROTTLINGS_EN. The remaining bits of the second value EV2 may be designated for events other than above described events.

Figure 5:
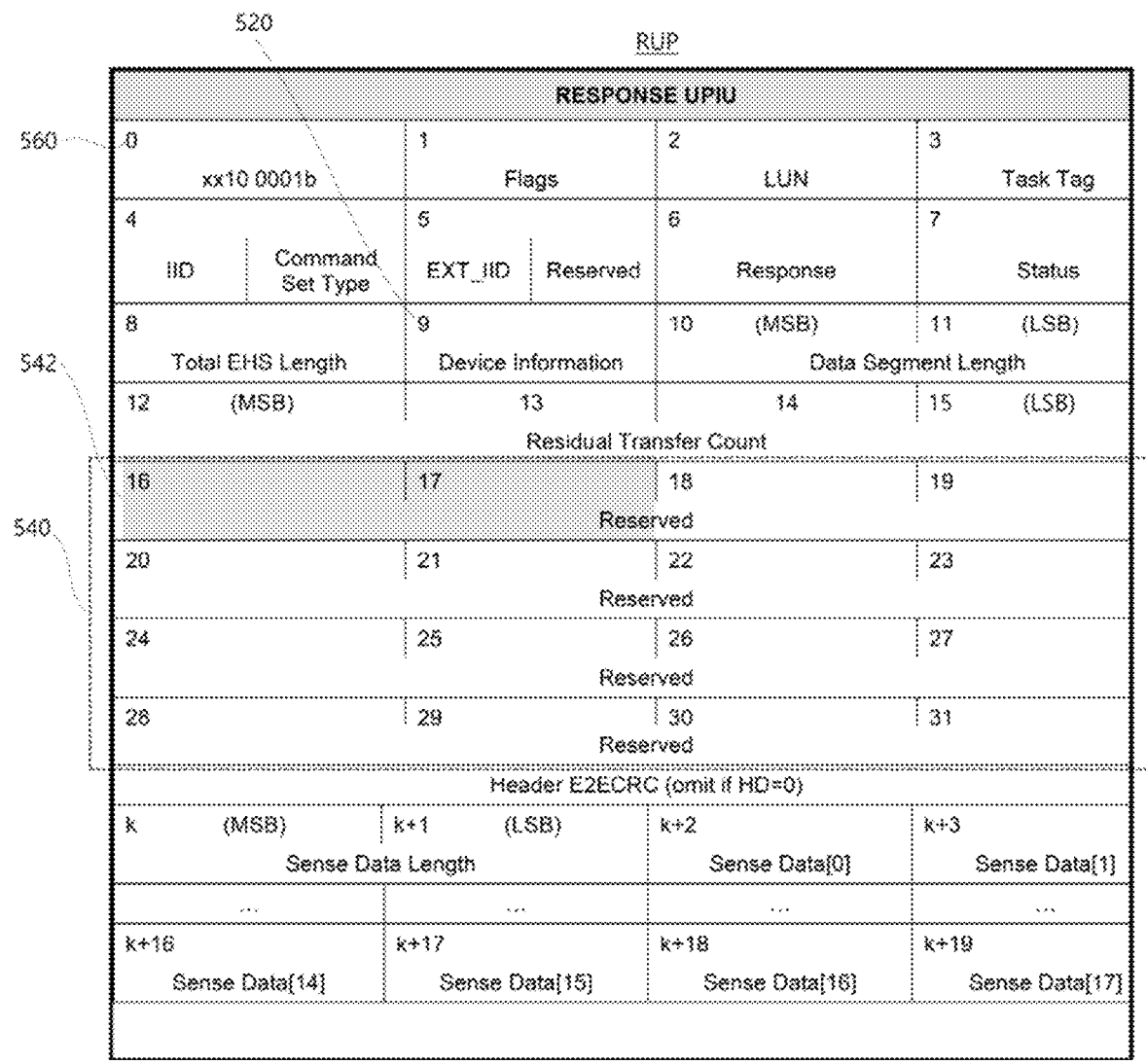
FIG. 5 is a diagram of a packet structure of a response universal flash storage (UFS) protocol information unit (UPIU) according to an embodiment of the present disclosure.

FIG. 5 is a diagram of a packet structure of the response UPIU RUP according to an embodiment of the present disclosure.

Referring to FIGS. 3 and 5, the response UPIU RUP according to an embodiment of the present disclosure may include a device information field 520 and at least one reserved field 540. The device information field 520 may include the first value EV1. The first value EV1 may be designated as an event alert bit EVENT_ALERT bit in the storage device 200 and the host device 320 which are interfaced with each other with the UFS standard. (The UFS Standard according to CITATION is incorporated herein by reference)

FIG. 5 illustrates that the response UPIU RUP may include 16 reserved fields 540 (e.g., fields 16-31). As described herein, when the reserved field 540 set as the second value EV2 is referred to as a first reserved field 542, the response UPIU RUP of FIG. 5 may include 2 first reserved fields 542. However, the number thereof may not be restricted. The number of the first reserved field 542 may vary according to a required size of the second value EV2 or a size of each field of the response UPIU RUP.

The second value EV2 may be designated as an exception event status attribute wExecptionEventStatus in the storage device 200 and the host device 320 which are interfaced with each other with the UFS standard. The event alert bit EVENT_ALERT bit and the exception event status attribute wExecptionEventStatus are described in more detail in the UFS interface specification. (the UFS interface specification according to CITATION is incorporated herein by reference)

A corresponding UPIU as the response UPIU RUP may be identified by a transaction code. The transaction code may be included in a transaction field 560. For example, when the transaction code is "xx10 0001b", the corresponding UPIU may be recognized as a command UPIU CUP. For reference, when the transaction code "xx00 0001b" is included in the transaction field 560, the corresponding UPIU may be recognized as a response UPIU RUP. Also, when the transaction codes are "xx01 0110b" and "xx11 0110b", the corresponding UPIU may be recognized as a query request UPIU QQUP and a query response UPIU QPUP, respectively. The query request UPIU and the query response UPIU may be UPIUs used to transmit and receive information about descriptors, attributes, and flags in addition to write data or read data transmitted and received through the command UPIU CUP and the response UPIU RUP between the storage device 200 and the host device 320 based on the UFS standard.

In the method shown in flowchart 100 of processing the exception events and the storage device 200 according to an embodiment of the present disclosure, generation of the exception events in the storage device 200 may inform the host device 320 through the response UPIU RUP such that additional query request UPIU QQUP and the query request UPIU QQUP may not be generated. Accordingly, the method shown in flowchart 100 of processing the exception events and the storage device 200 according to an embodiment of the present disclosure may rapidly transmit the exception events to the host device 320 and improve processing efficiency of the exception events. In this regard, the storage device 200 or the system 300 including the storage device 200 may be stably operated.

Figure 6:
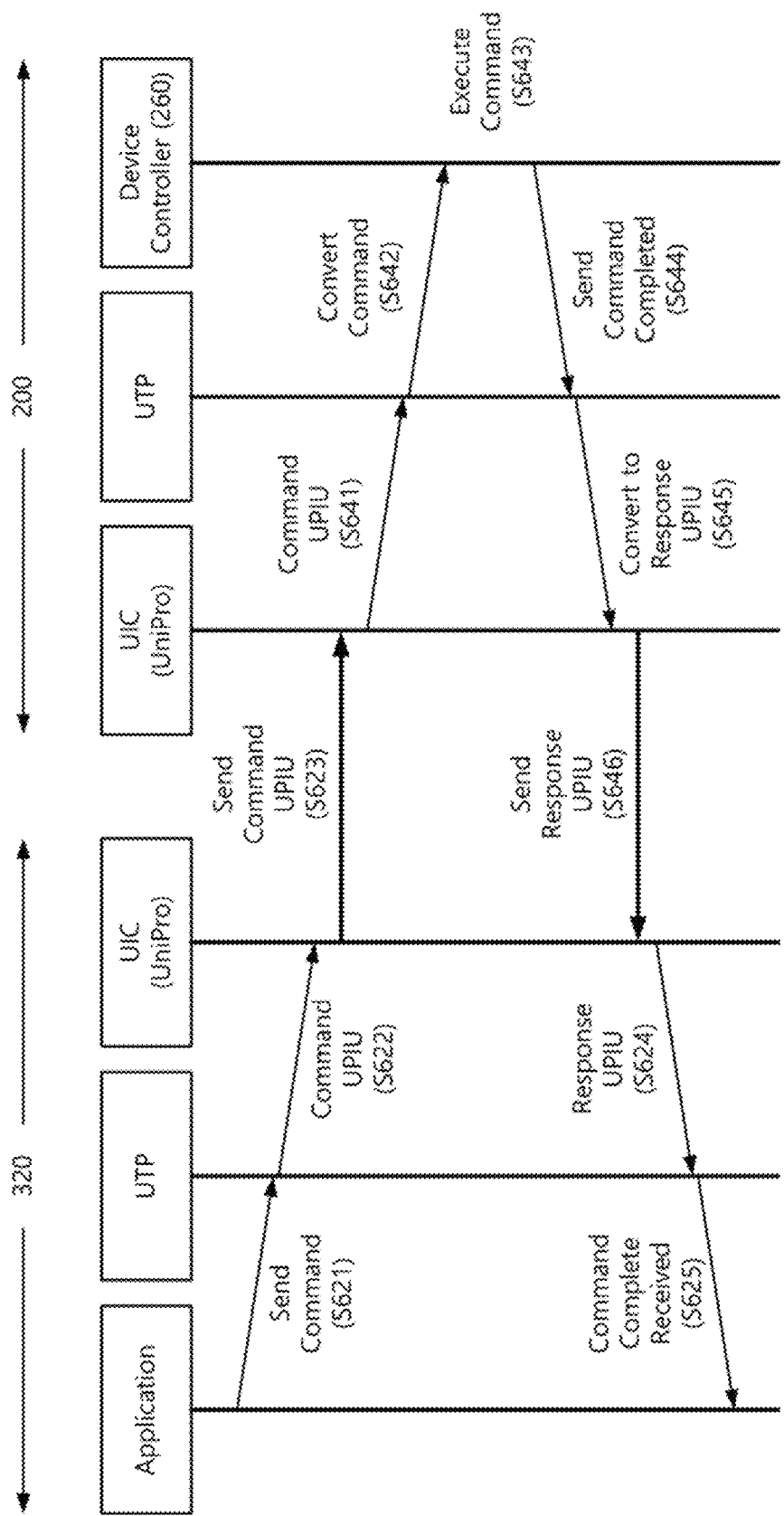
FIG. 6 is a diagram of a process in which a response UPIU is transmitted to a host device according to an embodiment of the present disclosure.

FIG. 6 is a diagram of a process in which the response UPIU RUP is transmitted to the host device 320 according to an embodiment of the present disclosure.

Referring to FIG. 6, when a request for an application is generated in the host device 320 in operation S621, a UFS transport layer UTP of the host device 320 may convert the request into a command UPIU CUP in operation S622. The request for an application may be processed as a write command or a read command. The command UPIU CUP may be converted into a transmission-available form on the link through a UFS interconnection layer UIC and may be output from the host device 320 in operation S623. The UFS interconnection layer UIC may process the command UPIU CUP according to Unified Protocol Unipro regulations. (The Unified Protocol Unipro according to CITATION is incorporated herein by reference). The Unified Protocol Unipro may include a link layer suggested for the interface of mobile devices by a mobile industry processor interface (MIPI) alliance.

The command UPIU CUP received in the storage device 200 may be provided to the UFS transport layer UTP of the storage device 200 through the UFS interconnection layer UIC of the storage device 200 in operation S641. The UFS interconnection layer UIC and the UFS transport layer UTP in the storage device 200 may be included in the device interface 240. The UFS transport layer UTP of the storage device 200 may convert the command UPIU CUP into a form which may be interpreted by the device controller 260 of the storage device 200 in operation S642.

A write command or a read command for the memory 220 may be executed through control of the device controller 260 in operation S643. The execution result may be transmitted to the UFS transport layer UTP of the storage device 200 in operation S644 and the UFS transport layer UTP of the storage device 200 may convert the execution result into the response UPIU RUP in operation S645. In operation S645, the response UPIU RUP may be converted into a form which may be transmitted on the link through the UFS interconnection layer UIC of the storage device 200 to be output in operation S646.

The UFS interconnection layer UIC of the host device 320 may receive the response UPIU RUP and transmits the received response UPIU RUP to the UFS transport layer UTP of the host device 320 in operation S624. The UFS transport layer UTP of the host device 320 may convert the response UPIU RUP into a form which may be processed in an application in operation S625. The host device 320 may determine that operations requested from an application are completed through above processes and may perform other operations.

Figure 7:
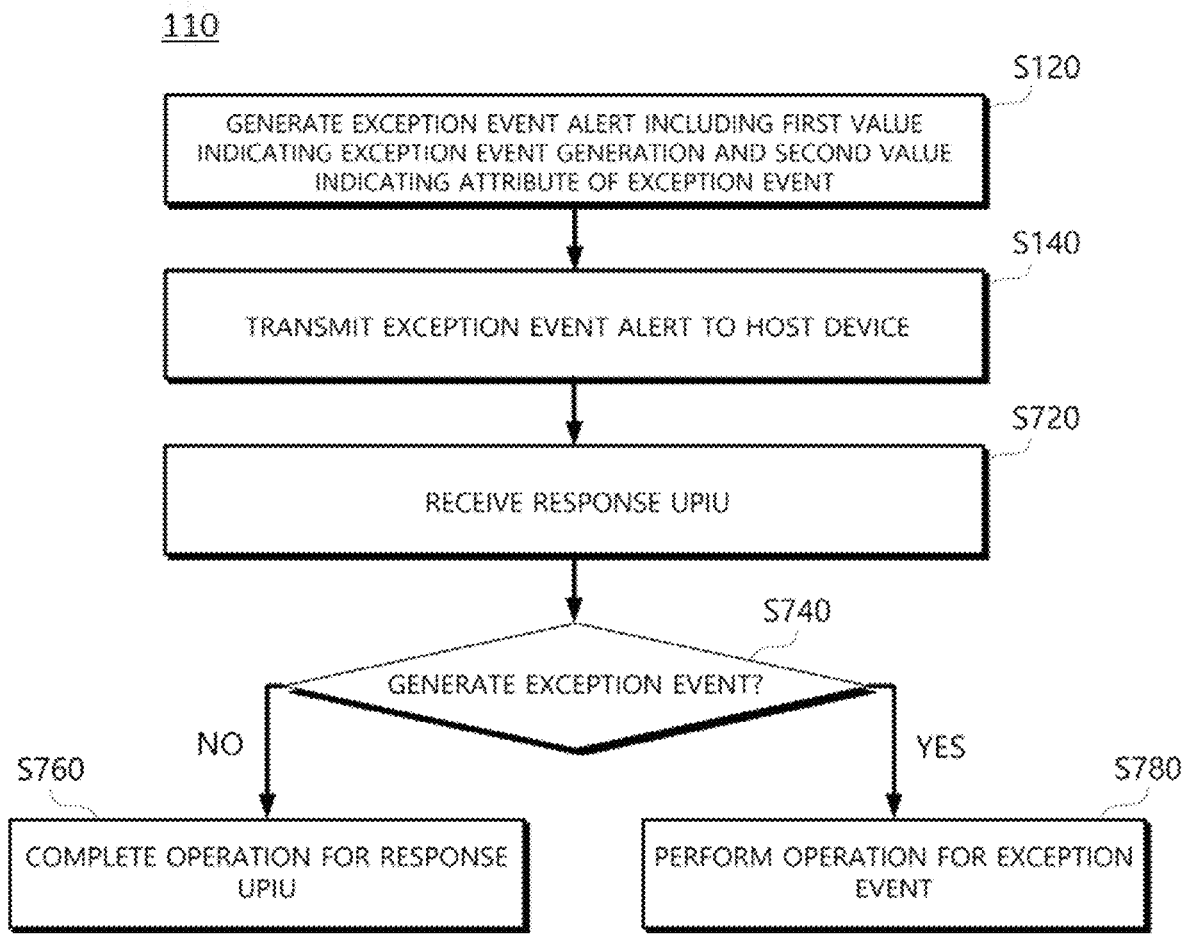
FIG. 7 is a flowchart illustrating a method of processing exception events according to an embodiment of the present disclosure.

FIG. 7 is a flowchart 110 illustrating the method of processing exception events according to an embodiment of the present disclosure performed. The method of the flowchart 110 may be performed by the system 300 in FIG. 3.

Referring to FIGS. 2, 3, and 7, in the method shown in flowchart 110 of processing exception events according to an embodiment of the present disclosure, when the storage device 200 generates the exception event alert EVTA through the response UPIU RUP and transmits the exception event alert EVTA included in the response UPIU RUP in operations S120 and S140, the host device 320 may receive the response UPIU RUP from the storage device 200 in operation S720. The host device 320 may identify generation of the exception events in the storage device 200 based on the first value EV1 and the second value EV2 included in the received response UPIU RUP in operation S740. For example, when the first value EV1 of the received response UPIU RUP is "1" and bit 3 of the second value EV2 is "1", the host device 320 may identify that the exception events designated as "excessively high temperature" are generated in the storage device 200. Also, for example, when the first value EV1 of the received response UPIU RUP is "1" and bit 6 of the second value EV2 is "1", the host device 320 may identify that the storage device 200 is operating at reduced performance.

When the exception events are not generated in the storage device 200 (NO in operation S740), the host device 320 may determine that the operation corresponding to the response UPIU RUP is completed in operation S760. On the other hand, when it is identified that the exception events are generated in the storage device 200 (YES in operation S740), the host device 320 may perform operations corresponding to the exception events in operation S780.

As in the example above, when it is identified that the exception event designated as "excessively high temperature" is generated in the storage device 200, the host device 320 may perform throttling or other cooling operation in order to lower Tease temperature. For example, the host device 320 may finish a part of executed applications. The host device 320 may perform an additional operation(s) to identify the temperature of the storage device 200. For example, an approximate temperature of the storage device 200 may be provided to the host device 320 through the attribute value "bDeviceCaseRoughTemperature".

In addition, as in the example above, when the storage device 200 operates at reduced performance, the host device 320 may perform an additional operation(s) to identify a cause of performance degradation. For example, the cause of performance degradation in the storage device 200 may be provided to the host device 320 through the attribute value "bThrotlingStatus".

The attribute value "bDeviceCaseRoughTemperature" and the attribute value "bThrotlingStatus" may be required to the storage device 200 through the query request UPIU QQUP and the query response UPIU QPUP and may be provided to the host device 320. However, the present disclosure is not limited thereto.

Figure 8:
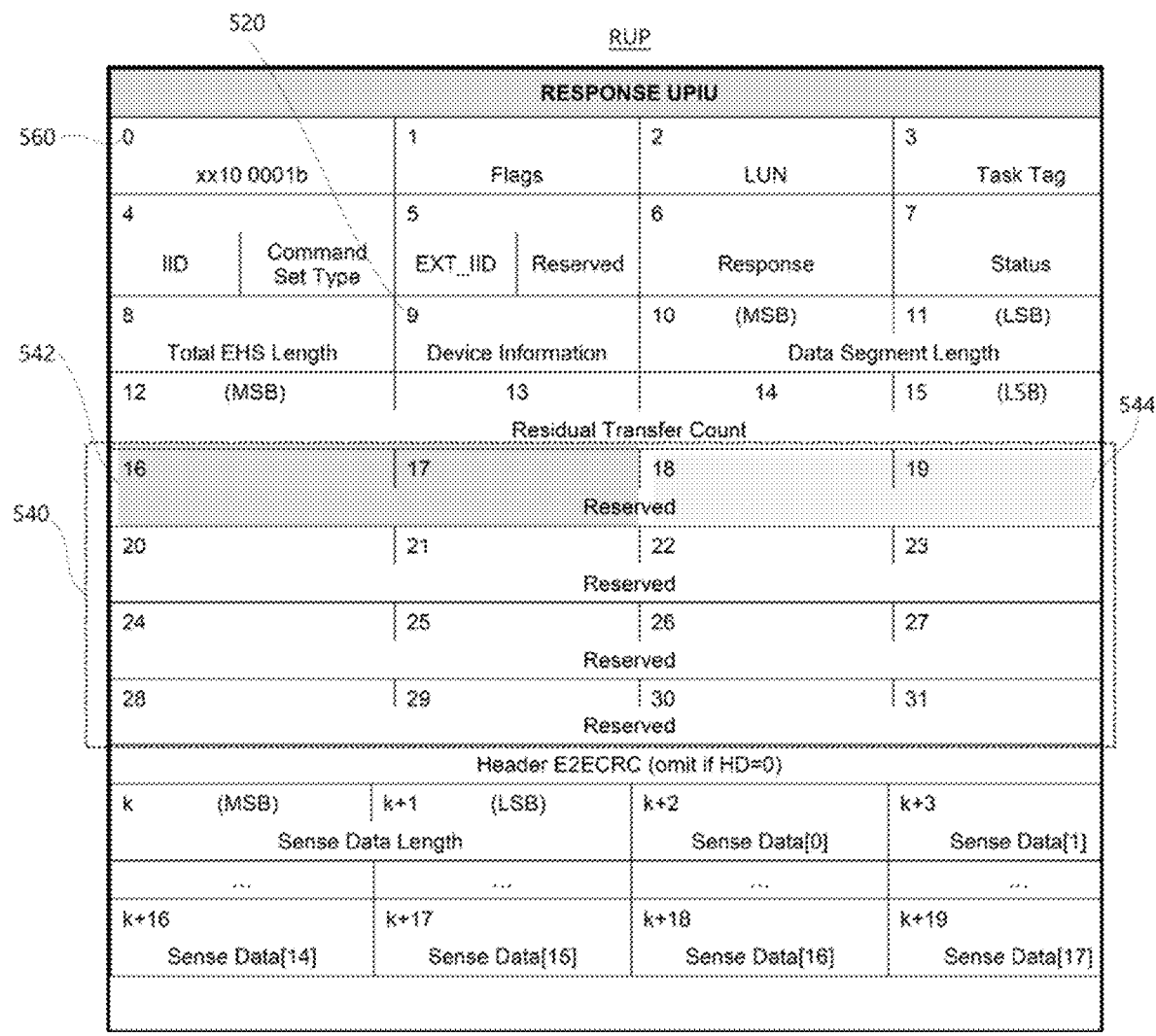
FIG. 8 is a diagram of a packet structure of a response UPIU including a second reserved field according to an embodiment of the present disclosure.

FIG. 8 is a diagram of a packet structure of a response UPIU RUP including a second reserved field 544 according to an embodiment of the present disclosure.

Referring to FIGS. 3 and 8, similarly to FIG. 5, the response UPIU RUP according to an embodiment of the present disclosure my include the device information field 520 set as the first value EV1 and the first reserved field 542 set as the second value EV2. Also, the response UPIU RUP of FIG. 8 may further include the second reserved field 544 set as an additional attribute value. The second reserved field 544 may include additional information about each attribute value of the second value EV2 such as "bDeviceCaseRoughTemperature" or "bThrotlingStatus" described above. In this case, the storage device 200 and the host device 320 may share information about required attributes without generating the query request UPIU QQUP and the query response UPIU QPUP.

Figure 9:
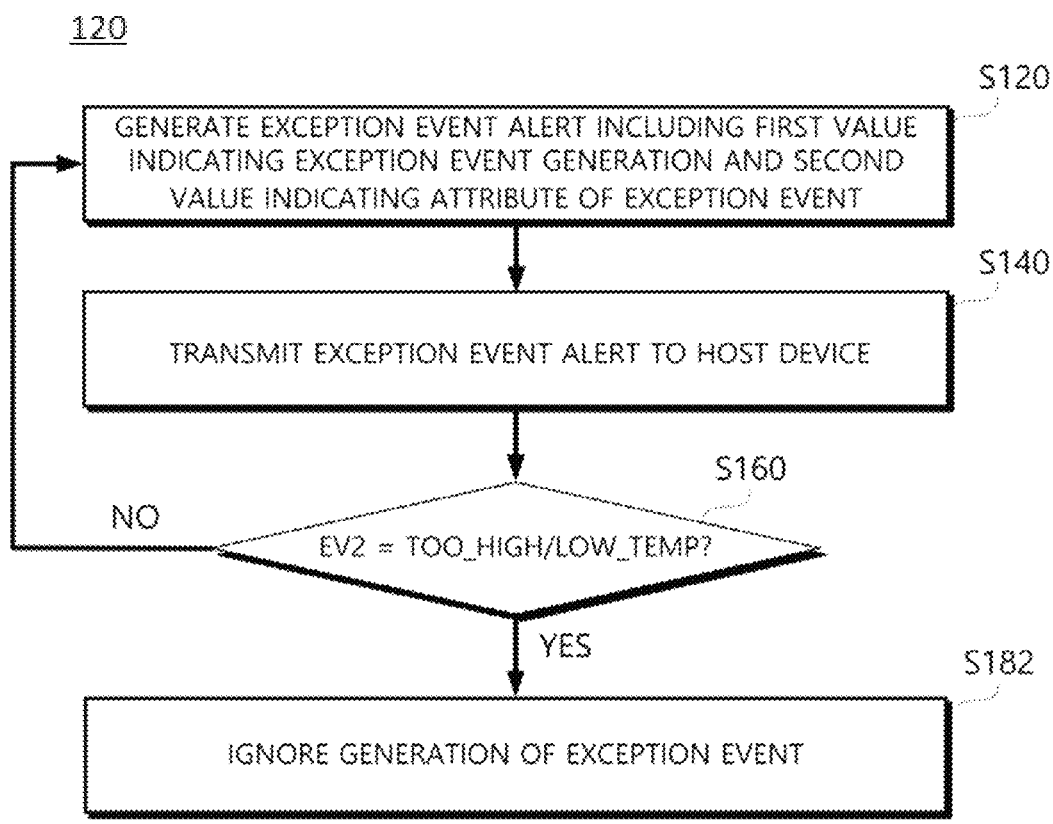
FIG. 9 is a flowchart illustrating a method of processing exception events in which generation of exception events is ignored in a storage device according to an embodiment of the present disclosure.

FIG. 9 is a flowchart 120 illustrating a method of processing exception events in which generation of exception events is ignored in a storage device 200 according to an embodiment of the present disclosure.

Referring to FIGS. 2, 3, and 9, the method shown in flowchart 120 of processing the exception events according to an embodiment of the present disclosure may include generating the exception event alert EVTA in operation S120 and transmitting the exception event alert EVTA in operation S140 as in FIG. 1. However, the method shown in flowchart 120 of processing the exception events in FIG. 9 may include ignoring generation of the exception events according to the second value EV2 in operation S182. For example, when the second value EV2 is an attribute value for the temperature of the storage device 200 (YES in operation S160), generation of the exception events may be ignored in operation S182. The method may also include rejecting transmission of generated exception events, preventing generation of exception events, etc., in addition to or alternatively to the ignoring operation.

After the events on "excessively high temperature" or "excessively low temperature" are generated in the storage device 200, a predetermined time may be required for the temperature of the storage device 200 to return to a temperature within the predefined temperature boundary. Accordingly, the first value EV1 and the second value EV2 may be continuously enabled until the temperature of the storage device 200 returns to a temperature within the predefined temperature boundary. In this case, system overhead grows, and the storage device 200 or the host device 320 may not be normally operated.

In the method shown in flowchart 120 of processing the exception events according to an embodiment of the present disclosure, after the events on "excessively high temperature" or "excessively low temperature" are generated in the storage device 200, a follow-up event is not processed for 1 hour (or another predefined time period). Thus, the storage device 200 or the system 300 including the storage device 200 may be stably and efficiently operated. As described above, the temperature boundary for the storage device 200 may be defined as the attributes "bDeviceTooHighTempBoundary" and "bDeviceTooLowTempBoundary".

Figure 10:
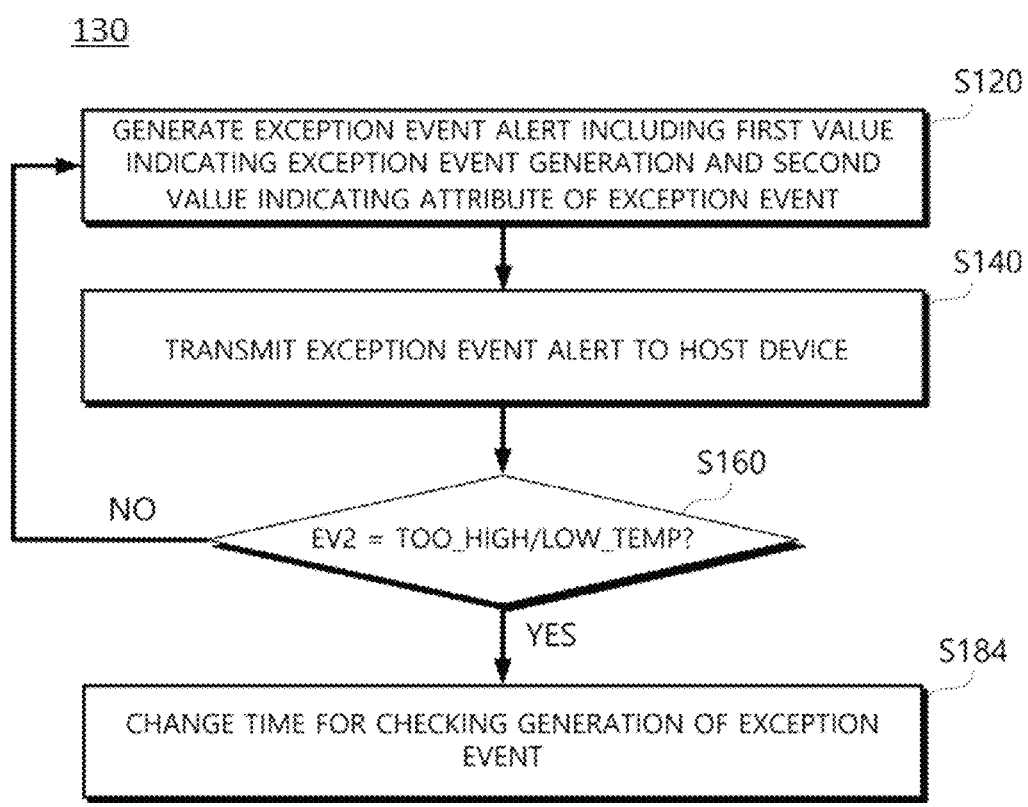
FIG. 10 is a flowchart illustrating a method of processing exception events where a generative cycle of a first value varies according to a second value in a storage device according to an embodiment of the present disclosure.

FIG. 10 is a flowchart 130 illustrating a method of processing exception events where a generative cycle of a first value EV1 varies according to a second value EV2 in a storage device 200 according to an embodiment of the present disclosure.

Referring to FIGS. 2, 3, and 10, the method shown in flowchart 130 of processing the exception events according to an embodiment of the present disclosure may include generating the exception event alert EVTA in operation S120 and transmitting the exception event alert EVTA in operation S140 as in FIG. 1. Also, the method shown in flowchart 130 of processing the exception events in FIG. 10 may include changing the time for checking whether follow-up exception events are generated according to the second value EV2 in operation S184.

For example, when the second value EV2 is an attribute value for the temperature of the storage device 200 (YES in operation S160), whether follow-up exception events are generated may be checked by changing a time interval in operation S184. When the second value EV2 is an attribute value for the temperature of the storage device 200, the time interval for checking whether the follow-up exception events are generated may be set to be longer than that of in a case when the second value EV2 is not an attribute value for temperature.

As described above, when the second value EV2 is an attribute value for the temperature of the storage device 200, the exception events alert EVTA may be continuously generated for a certain period of time and thereby, system overhead may occur. According to the method shown in flowchart 130 of processing the exception events according to an embodiment of the present disclosure, when the exception events generated in the storage device 200 are related to the temperature, an amount of time for determining whether the follow-up exception events are generated (i.e., a generative cycle of the first value EV1) or an amount of time until a next exception event is generated may be lengthened to address such a problem. That is, the method may reduce the number of times an exception event is generated within a predetermined time interval, or the method may increase the time interval between the generation of subsequent exception events.

Figure 11:
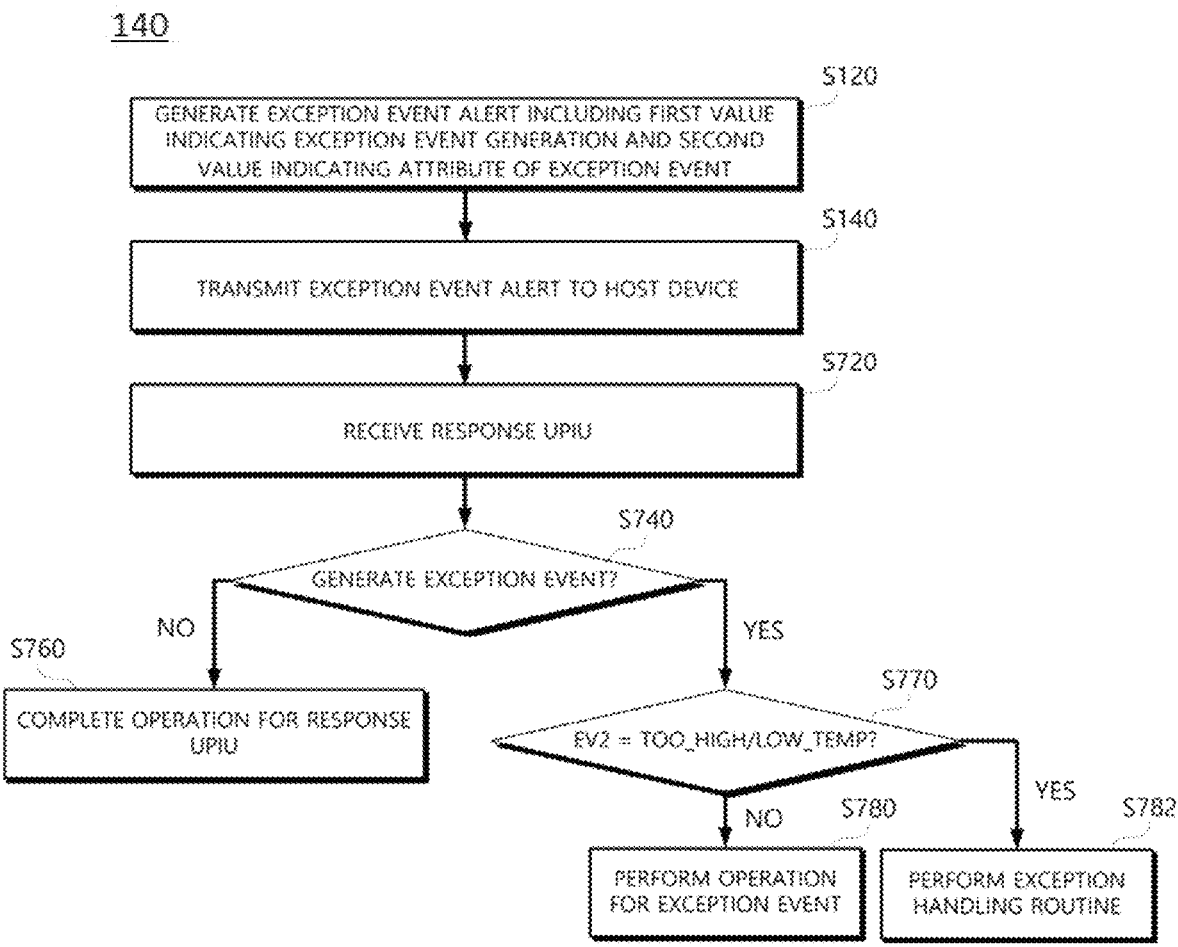
FIG. 11 is a flowchart illustrating a method of processing exception events in which an exception processing routine is performed according to a second value in a host device according to an embodiment of the present disclosure.

FIG. 11 is a flowchart 140 illustrating a method of processing exception events in which an exception processing routine is performed according to a second value EV2 in a host device 320 according to an embodiment of the present disclosure.

Referring to FIGS. 2, 3, and 11, the method shown in flowchart 140 of processing the exception events according to an embodiment of the present disclosure may include generating and transmitting the exception event alert EVTA from the storage device 200 in operations S120 and S140 as in FIG. 7 and then, receiving the response UPIU RUP in the host device 320 from the storage device 200 in operation S720. The host device 320 may identify generation of the exception events in the storage device 200 based on the first value EV1 and the second value EV2 included in the received response UPIU RUP in operation S740.

In addition, the method shown in flowchart 140 of processing the exception events in FIG. 11 may further include performing an exception processing routine according to the second value EV2 in operation S782. For example, when the second value EV2 is an attribute value for the temperature of the storage device 200 (YES in operation S770), the host device 320 may not process an event corresponding to the first value EV1 and the second value EV2 of the response UPIU RUP. Accordingly, a problem occurring due to the exception events alert EVTA being generated continuously while the temperature of the storage device 200 returns to a normal range may be prevented.

Figure 12:
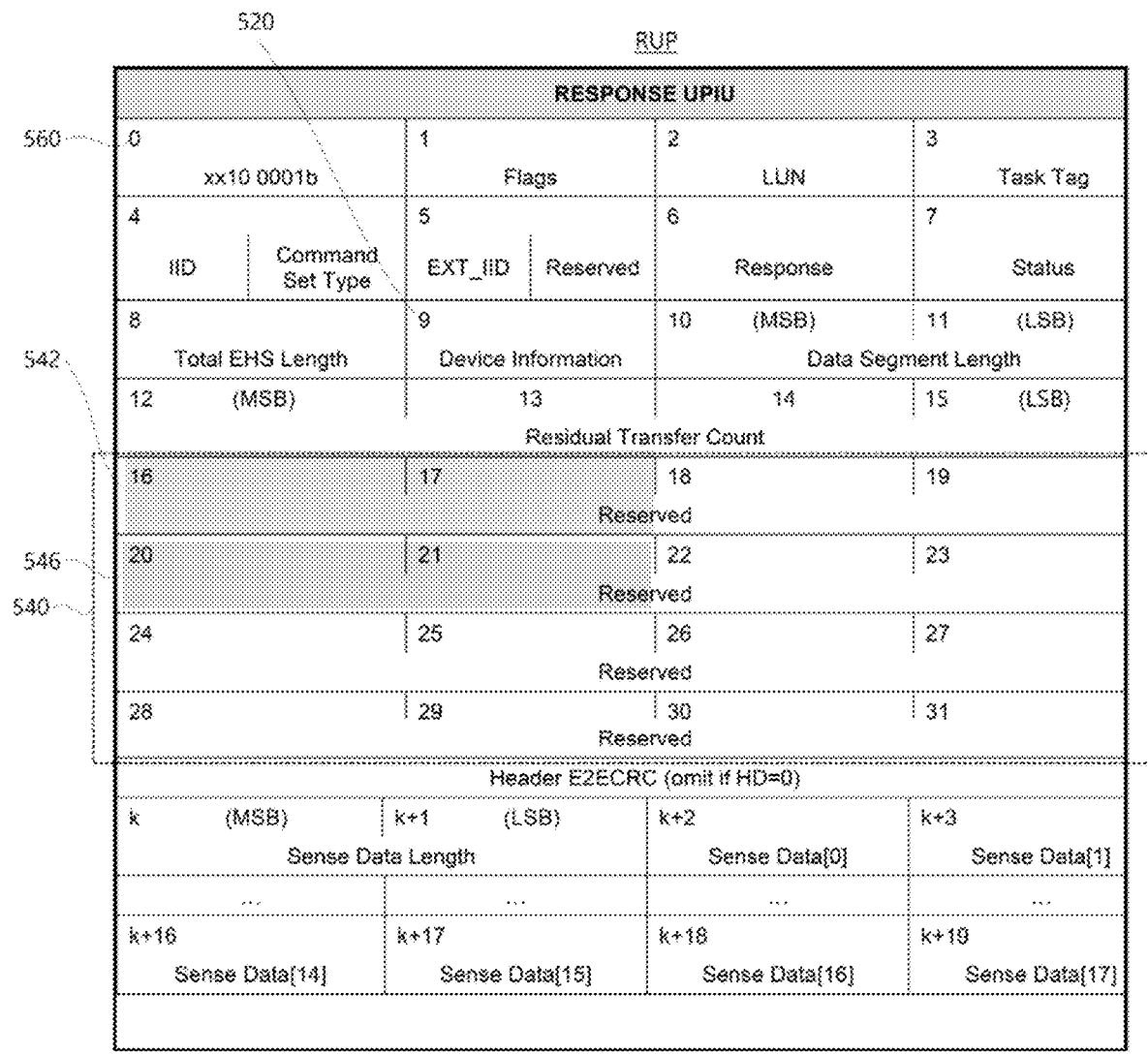
FIG. 12 is a diagram of a packet structure of a response UPIU including a third reserved field according to an embodiment of the present disclosure.

FIG. 12 is a diagram of a packet structure of a response UPIU RUP including a third reserved field 546 according to an embodiment of the present disclosure.

Referring to FIGS. 3 and 12, the response UPIU RUP according to an embodiment of the present disclosure my include the device information field 520 set as the first value EV1 and the first reserved field 542 set as the second value EV2 as in FIG. 5. In addition, the response UPIU RUP of FIG. 12 may further include the third reserved field 546 set as a third value EV3.

The third value EV3 may be set when processing of the exception events is controlled independently of the first value EV1 and the second value EV2. For example, the third value EV3 may be an attribute value of "wExceptionEventControl". For example, when the third value EV3 is set to "0", control of the exception events may be performed in the storage device 200. The third value EV3 may be set based on performance of the system 300 or resources of the system 300 when a link between the storage device 200 and the host device 320 is initialized.

Figure 13:
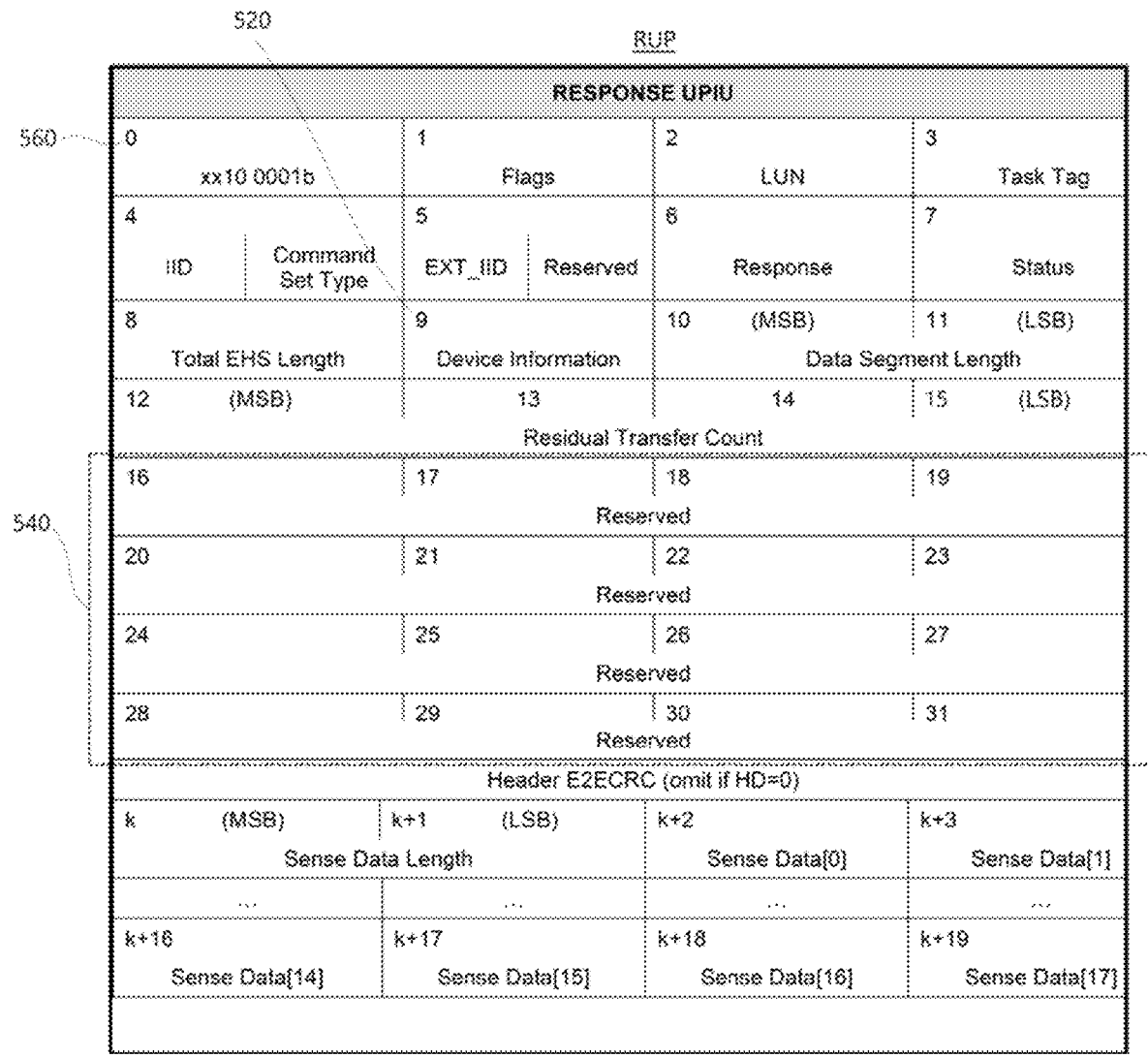
FIG. 13 is a diagram of a packet structure of a response UPIU in which a second value is not included according to an embodiment of the present disclosure.
Figure 14:
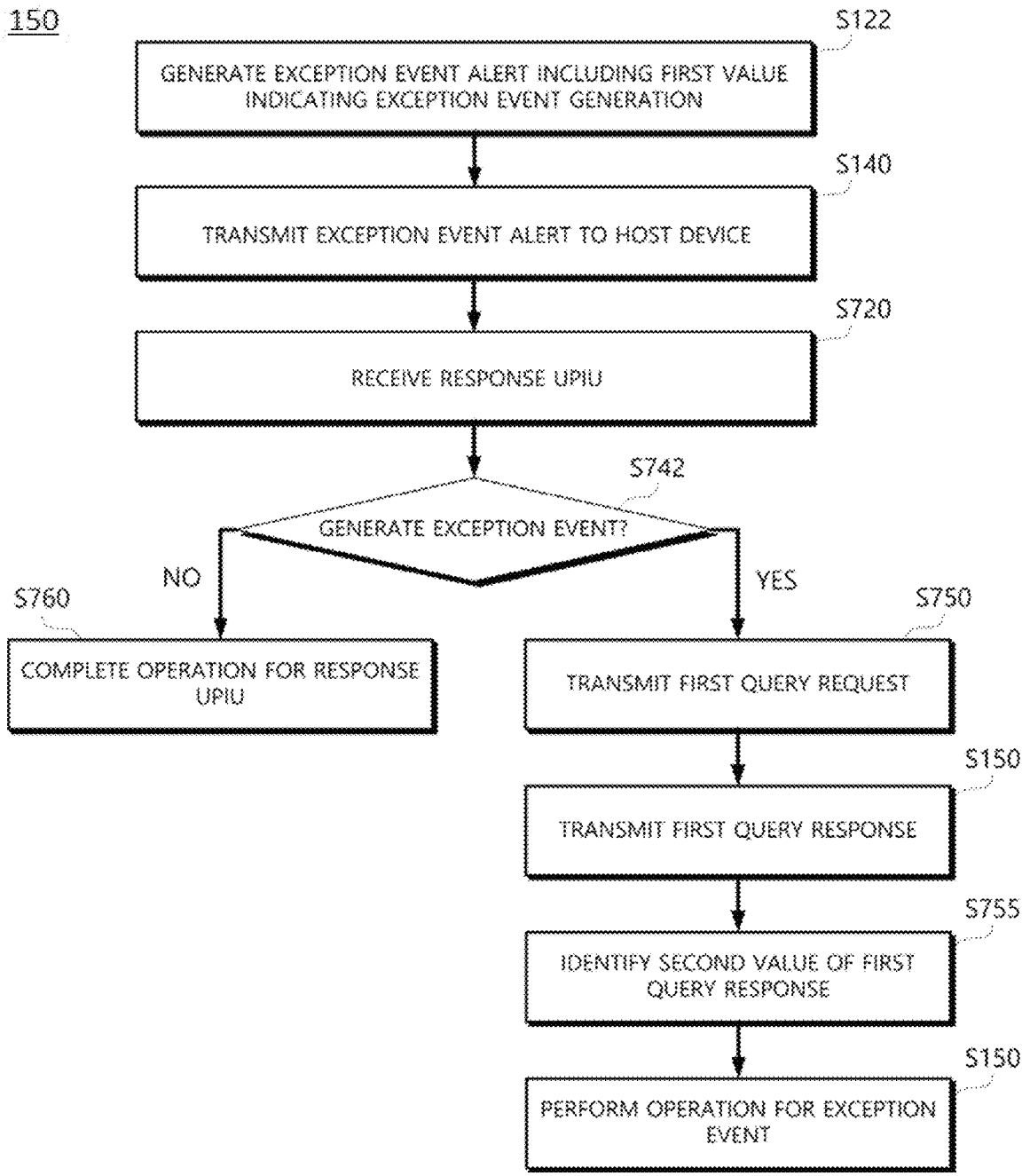
FIG. 14 is a flowchart illustrating a method of processing exception events according to an embodiment of the present disclosure.

FIG. 13 is a diagram of a packet structure of a response UPIU RUP in which a second value EV2 is not included according to an embodiment of the present disclosure. FIG. 14 is a flowchart 150 illustrating the method of processing the exception events when the response UPIU RUP of FIG. 13 is generated according to an embodiment of the present disclosure.

Referring to FIGS. 2, 3, 13, and 14, similarly to FIG. 5, the response UPIU RUP according to an embodiment of the present disclosure may include the device information field 520 set as the first value EV1. However, the response UPIU RUP of FIG. 13 may not include the first reserved field 542 of FIG. 5. The device controller 260 may control the response UPIU RUP to not include the second value EV2 based on performance that is required of the storage device 200 or based on a resource restriction of the storage device 200.

When the storage device 200 generates and transmits the exception event alert EVTA including the first value EV1 only in operations S122 and S140, the host device 320 may receive the response UPIU RUP which does not include the second value EV2 in operation S720 and may identify the first value EV1 in operation S742. When the exception events are not generated in the storage device 200 (NO in operation S742) (e.g., when the first value EV1 is set to "0" in the response UPIU RUP), the host device 320 may determine that operation corresponding to the response UPIU RUP is completed in operation S760.

On the other hand, when it is identified that the exception events are generated in the storage device 200 (YES in operation S742), the host device 320 may transmit a first query request to the storage device 200 requesting the second value EV2 in operation S750. The storage device 200 may transmit a first query response including the second value EV2 to the host device 320 in response to the first query request in operation S150. As described above, the second value EV2 may indicate an attribute of the exception event generated in the storage device 200.

That is, the storage device 200 and the host device 320 may share the attributes of the exception events generated in the storage device 200 through the first query request and the first query response. The first query request and the first query response may each be transmitted in the form of a query request UPIU QQUP and a query request UPIU QQUP. The host device 320 may identify the second value EV2 of the first query response in operation S755 and may perform an operation corresponding to the exception events in operation S780.

Figure 15:
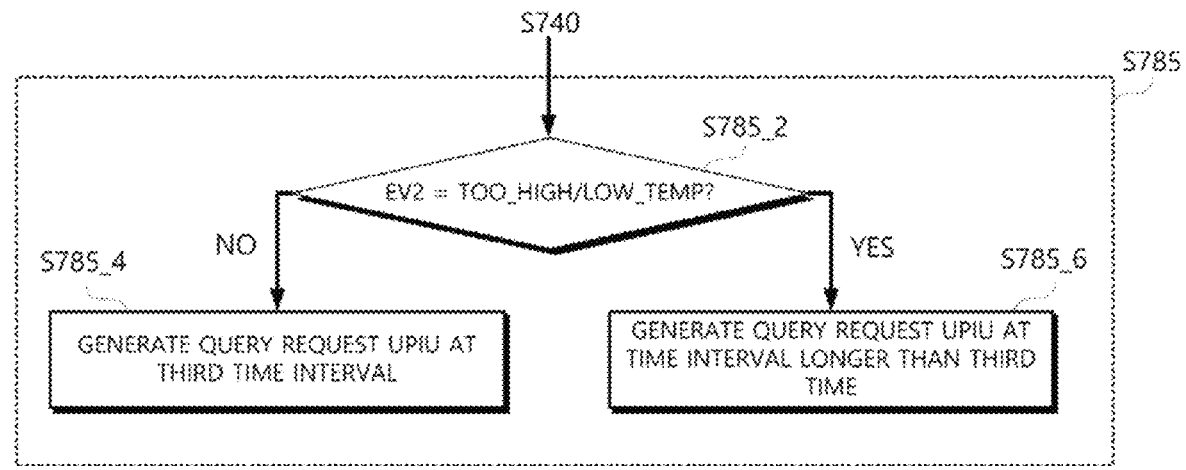
FIGS. 15 and 16 are flowcharts respectively illustrating methods of processing exception events in which processing of a follow-up query request UPIU varies according to a second value in a host device and a storage device according to an embodiment of the present disclosure.
Figure 16:
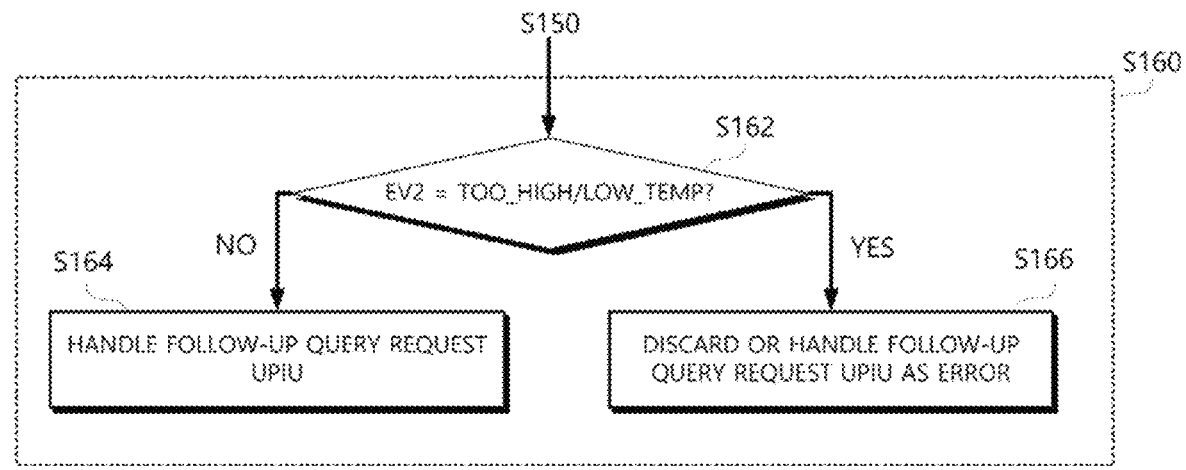

FIGS. 15 and 16 are flowcharts respectively illustrating methods of processing exception events in which processing of a follow-up query request UPIU varies according to a second value in a host device and a storage device according to an embodiment of the present disclosure.

First, referring to FIGS. 2, 3, and 15, the host device 320 may receive the query response UPIU QPUP and then, a second query request (i.e., the follow-up query request UPIU QQUP), may be generated at a third time interval (e.g., at a predetermined amount of time after the sequent query request). The host device 320 may maintain or change the third time interval according to the second value EV2 in operation S785.

For example, when the second value EV2 of the query response UPIU QPUP is not related to a temperature event (NO in operation S785_2), the host device 320 may generate the follow-up query request UPIU QQUP at the predefined third time interval in operation S785_4. On the other hand, when the second value EV2 of the query response UPIU QPUP is related to a temperature event (YES in operation S785_2), the host device 320 may change the predefined third time interval and generate the follow-up query request UPIU QQUP in operation S785_6. For example, when the second value EV2 of the query response UPIU QPUP is related to a temperature event (YES in operation S785_2), the host device 320 may generate the follow-up query request UPIU QQUP at a time interval longer than the predefined third time interval.

The host device 320 may generate the follow-up query request UPIU QQUP by maintaining or changing the third time and then, may process the query response UPIU QPUP corresponding to the follow-up query request UPIU QQUP by using the method of the flowchart 150 of FIG. 14.

Referring to FIGS. 2, 3, and 16, the storage device 200 may change processing of the second query request (i.e., the follow-up query request UPIU QQUP) according to the second value EV2 in operation S160.

For example, when the second value EV2 included in the query response UPIU QPUP transmitted in operation S150 is not related to the exception event for the temperature (NO in operation S162), the storage device 200 may process the follow-up query request UPIU QQUP. That is, the storage device 200 may generate the query response UPIU QPUP corresponding to the follow-up query request UPIU QQUP. However, when the second value EV2 included in the query response UPIU QPUP transmitted in operation S150 is related to the exception event for the temperature (YES in operation S162), the storage device 200 may discard or process the follow-up query request UPIU QQUP as an error. The follow-up query request UPIU QQUP may be received within the fourth time interval after the query response UPIU QPUP is transmitted in operation S166.

As described above, in the method of processing the exception events according to an embodiment of the present disclosure, the method may be performed in at least one of the host device 320 and the storage device 200 such that problems occurring due to continuous generation of the exception events on a temperature abnormality may be prevented in the storage device 200.

According to the method of processing the exception events and the storage device for processing the exception events using the method, efficiency of processing the exception events may be improved.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Each of the embodiments provided in the above description is not excluded from being associated with one or more features of another example or another embodiment also provided herein or not provided herein but consistent with the disclosure.

While the disclosure has been particularly shown and described with reference to embodiments thereof, it will be understood that various changes in form and details may be made therein without departing from the spirit and scope of the following claims.

What is claimed is:

1. A method of processing exception events for a storage device, the method comprising:
   generating, by the storage device, a first exception event alert comprising a first value and a second value, wherein the first value indicates generation of exception events and the second value indicates attributes of the exception events;
   transmitting, from the storage device, the first exception event alert to a host device;
   determining, by the host device, that the first exception event alert indicates an abnormality of the storage device; and
   based on determining that the first exception event alert indicates the abnormality of the storage device, identifying, by the host device, a type of exception event corresponding to the first exception event alert based on the second value and performing an exception processing routine based on the identified type of exception event.

2. The method of claim 1, wherein the first exception event alert is transmitted in a response universal flash storage (UFS) protocol information unit (UPIU).

3. The method of claim 2, wherein the response UPIU comprises a device information field and at least one reserved field,
   wherein the first value corresponds to the device information field, and
   wherein the second value corresponds to the at least one reserved field.

4. The method of claim 2, wherein the response UPIU is generated in response to a command UPIU received by the storage device.

5. The method of claim 1, wherein the first value comprises a bit value corresponding to an event alert bit.

6. The method of claim 1, wherein the second value comprises an attribute value corresponding to an exception event status attribute.

7. The method of claim 1, wherein the first exception event alert further comprises a third value for controlling processing of the exception events independently from the first value and the second value.

8. The method of claim 1, further comprising, after the first exception event alert is generated by the storage device, ignoring, based on the second value, generation of at least one follow-up exception event for a predetermined amount of time.

9. The method of claim 8, further comprising determining to perform the ignoring of the generation of follow-up exception events based on the second value being an attribute value corresponding to a temperature of the storage device.

10. The method of claim 1, wherein the exception processing routine comprises at least one of:
    changing a first time interval for generating an exception event;
    determining to not process an event corresponding to the first value and the second value;
    changing a second time interval for generating, by the host device, a follow-up query request that obtains a subsequent exception event alert from the storage device; and
    discarding a follow-up query request for obtaining a subsequent exception event alert from the storage device.

11. The method of claim 10, wherein changing the first time interval comprises the setting the first time interval to a third time interval based on the second value being an attribute value corresponding to a temperature of the storage device, the third time interval being longer than a fourth time interval that is set based on the second value not being an attribute value corresponding to the temperature of the storage device.

12. The method of claim 1, further comprising:
generating a second exception event alert which does not include the second value indicating attributes of the exception events;
transmitting, from the storage device, the second exception event alert to the host device; and
transmitting, from the host device and to the storage device, a first query request requesting the second value indicating attributes of the exception events.

13. The method of claim 12, further comprising:
transmitting, to the host device from the storage device and in response to the first query request, a first query response comprising the second value indicating attributes of the exception events;
changing a third time interval based on the second value; and
generating a second query request during the third time interval.

14. The method of claim 13, further comprising discarding or processing the second query request as an error based on the second query request being received at least one time within a fourth time interval after the first query response is transmitted by the storage device.

15. A method of processing exception events for a universal flash storage (UFS) device, the method comprising:
generating, using a device controller within the UFS device, an event alert bit corresponding to exception events;
generating, using a device interface within the UFS device, a response UFS protocol information unit (UPIU) comprising an attribute value corresponding to an exception event status attribute;
outputting the response UPIU to a UFS host;
determining that the exception event status attribute indicates an abnormality of the UFS device; and
based on determining that the exception event status attribute indicates the abnormality of the UFS device, identifying a type of exception event corresponding to the exception event status attribute and performing an exception processing routine based on the identified type of exception event.

16. The method of claim 15, further comprising receiving, from the UFS host, the response UPIU indicating that a query request is not to be generated.

17. The method of claim 15, further comprising changing, by the device controller, a reset time of the attribute value based on the attribute value.

18. The method of claim 17, wherein the changing the reset time of the attribute value comprises setting the reset time to a first time based on the attribute value indicating an attribute corresponding to a temperature of the UFS device, and
wherein the first time is longer than a second time corresponding to other attribute values not corresponding to the temperature of the UFS device.

19. A memory system comprising:
a storage device comprising:
a memory;
a device interface configured to:
receive a command universal flash storage (UFS) protocol information unit (UPIU) corresponding to a write or a read to the memory; and
transmit a response UPIU to a host device; and
a device controller configured to generate the response UPIU based on exception events occurring, and
a host;
wherein the response UPIU comprises a first value indicating generation of exception events and a second value indicating attributes of the exception events,
wherein the second value indicates which exception event has occurred in the storage device, and
wherein the host is configured to:
determine that the response UPIU indicates an abnormality of the storage device; and
based on determining that the response UPIU indicates the abnormality of the storage device, identify a type of exception event corresponding to the response UPIU based on the second value and perform an exception processing routine corresponding to the identified type of exception event.

* * * * *